(12) United States Patent
Hassdenteufel

(10) Patent No.: US 6,213,068 B1
(45) Date of Patent: Apr. 10, 2001

(54) METHOD OF CHECKING THE OPERABILITY OF THE VARIABLE VALVE CONTROL IN AN INTERNAL COMBUSTION ENGINE

(75) Inventor: Armin Hassdenteufel, Unterriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/457,871

(22) Filed: Dec. 10, 1999

(30) Foreign Application Priority Data

Dec. 11, 1998 (DE) .............................................. 198 57 183

(51) Int. Cl.$^7$ ........................... F01L 13/00; F02D 13/02; F02D 41/22

(52) U.S. Cl. .................................... 123/90.15; 123/90.11; 73/116; 73/117.3; 73/118.1

(58) Field of Search ............................. 123/90.11, 90.12, 123/90.13, 90.14, 90.15, 90.16, 90.17, 90.18, 198 D; 73/116, 117.2, 117.3, 118.1, 118.2

(56) References Cited

U.S. PATENT DOCUMENTS

| 4,957,074 | 9/1990 | Weissler, II et al. | ............. 123/90.11 |
|---|---|---|---|
| 5,549,080 | * 8/1996 | Uchikawa | ......................... 123/90.16 |
| 5,588,411 | 12/1996 | Kreuter et al. | ....................... 123/418 |
| 5,644,073 | * 7/1997 | Matsuno et al. | .................... 73/118.1 |
| 5,979,378 | * 11/1999 | Matsuno et al. | .................. 123/90.15 |
| 6,050,250 | * 4/2000 | Kerkau | ................................ 123/688 |

* cited by examiner

Primary Examiner—Weilun Lo
(74) Attorney, Agent, or Firm—Walter Ottesen

(57) ABSTRACT

The invention is directed to a method for checking the operability of a variable valve control in an internal combustion engine having an intake manifold and wherein the state of the variable valve control contributes to determining the combustion chamber charge. A first signal is provided and is indicative of the air mass actually drawn in by the engine via the intake manifold. A primary signal (HLS) for the combustion chamber charge is formed from the first signal. A second signal is formed from a desired value for the state of the variable valve control and at least one of the following: the position of a throttle flap, the pressure in the intake manifold and the rpm of the engine. An ancillary signal (NLS) for the combustion chamber charge is formed from the second signal. The primary and ancillary signals (HLS, NLS) are compared and an index is formed for the deviation of the primary and ancillary signals (HLS, NLS) from each other. A fault signal is outputted and/or stored when the index exceeds a predetermined value.

3 Claims, 3 Drawing Sheets

METHOD OF CHECKING THE OPERABILITY OF THE VARIABLE VALVE CONTROL IN AN INTERNAL COMBUSTION ENGINE

FIELD OF THE INVENTION

The invention relates to a diagnosis of a variable control of the gas exchange in an internal combustion engine.

BACKGROUND OF THE INVENTION

The term gas exchange characterizes the periodic change of the cylinder charge, that is, the discharge of exhaust gas and the inflow into the combustion chamber of air or air/fuel mixture. In conventional internal combustion engines, the control of the gas exchange takes place via resiliently-biased valves which are opened by a camshaft. The opening function is a time-dependent function, that is, the start, duration and extent of the opening are determined by the form of the camshaft. The opening function can therefore be precisely fixed by the shape of the camshaft but is not variable.

Additional systems are known for controlling the exchange of gas with a variable opening function. International patent publication WO 91/08384 corresponds to U.S. Pat. No. 4,957,074 and discloses an electromagnetically controlled and hydraulically actuated valve having a variable opening function. German patent publication 195 01 386 corresponds to U.S. Pat. No. 5,588,411 and discloses a variable valve control wherein the opening function of the gas-exchange valve is determined by an opening camshaft and a closing camshaft. The opening function can be varied within wide limits via a change of the phase shift between the shafts rotating at the same rotational frequency.

The operability of the variable valve control or the operability of the change of the opening function is relevant for the emission of the exhaust gas and must therefore be monitored.

SUMMARY OF THE INVENTION

It is an object of the invention to provide a method of monitoring the variable valve control without additional sensors. More specifically, it is an object of the invention to provide such a method utilizing already available sensors which are provided for other purposes. Those sensors which are anyway already available detect the air mass inducted by the engine and are sensors for the position of the throttle flap in the intake manifold and, if required, for the pressure in the intake manifold.

The method of the invention is for checking the operability of a variable valve control in an internal combustion engine having an intake manifold and wherein the state of the variable valve control contributes to determining the combustion chamber charge. The method includes the steps of: providing a first signal indicative of the air mass actually drawn in by the engine via the intake manifold; forming a primary signal (HLS) for the combustion chamber charge from the first signal; providing a second signal formed from a desired value for the state of the variable valve control and at least one of the following: the position of a throttle flap, the pressure in the intake manifold and the rpm of the engine; forming an ancillary signal (NLS) for the combustion chamber charge from the second signal; comparing the primary and ancillary signals (HLS, NLS) and forming an index for the deviation of the primary and ancillary signals (HLS, NLS) from each other; and, outputting and/or storing a fault signal when the index exceeds a predetermined value.

The invention is based on the consideration that a change of the opening function of the inlet valve influences the throttling of the engine directly at the inlet valves. Throttling, in this context, is understood to mean that the gas quantity, which flows via the valve, becomes less with decreasing valve stroke and with decreasing duration of opening. For the same throttle flap angle, the cylinder charge is thereby dependent upon the throttle action of the inlet valves and therefore upon the opening function. The cylinder charge can also be characterized as load and can be computed from the signal of an air mass sensor. Known air mass sensors are hot wires or hot-film air mass sensors. These sensors supply a so-called primary load signal HLS which is derived from the inducted air mass. A further index for the cylinder charge can be derived from the opening angle a of a throttle flap in the intake manifold. This additional index is identified in the following as an ancillary load signal NLS.

In contrast to the primary load signal, the ancillary load signal is dependent upon the opening function of the inlet valves. If the provided opening function does not develop, then the ancillary load signal is burdened with an error. An essential element of the invention is the evaluation of the operability of the variable valve control on the basis of a comparison of the primary and ancillary load signals.

This affords the advantage that no additional actuators or sensors are needed for the diagnosis. A further advantage is that the diagnosis is possible in the normal operation of the engine. The only slight complexity as to additional software is also advantageous because the primary load signal and the ancillary load signal are already present.

An embodiment of the invention includes a lambda control in the diagnosis, with this lambda control being individual for a cylinder bank. This permits a determination as to whether both cylinder banks or only one cylinder bank are/is affected by the malfunction and, furthermore, the affected cylinder bank can be identified.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
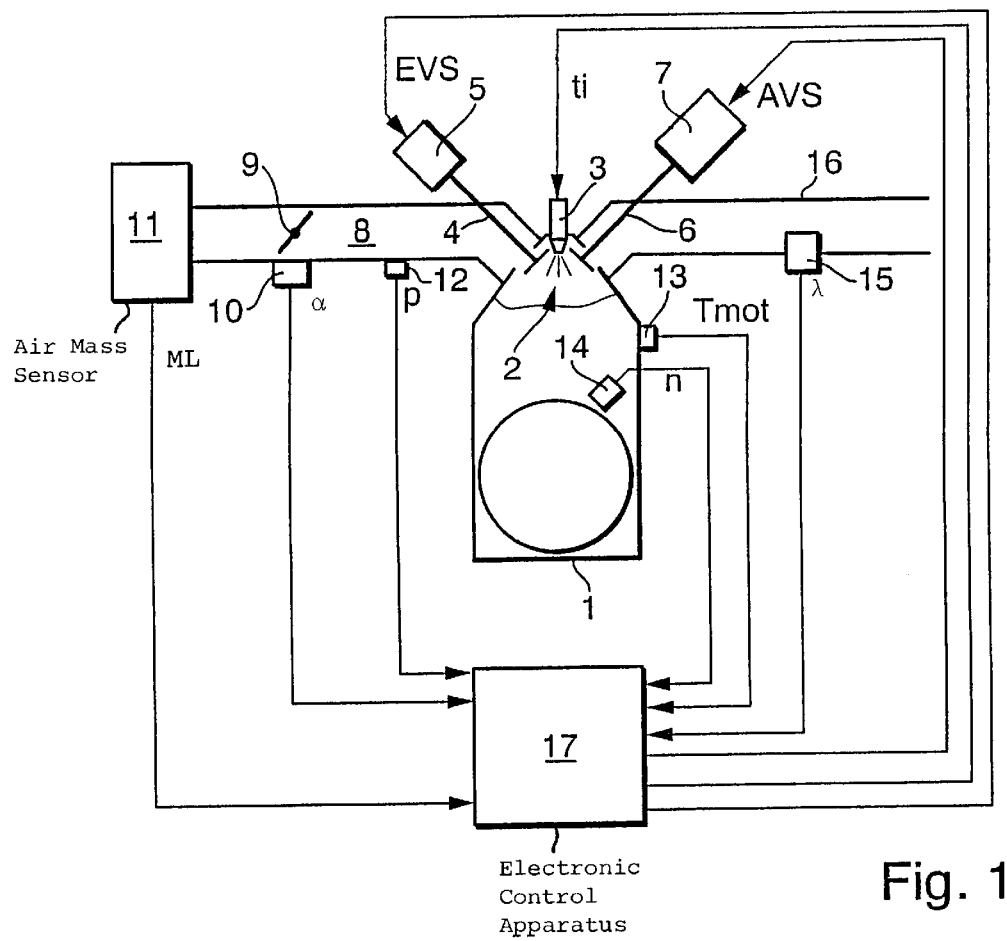
FIG. 1 is a schematic showing the background in which the method of the invention is carried out.

FIG. 1 shows an internal combustion engine 1 having a combustion chamber 2, injection valve 3, inlet valve 4, inlet valve actuator 5, outlet valve 6, outlet valve actuator 7, induction manifold 8, throttle flap 9, transducer 10 for the throttle flap opening angle a, air mass sensor 11, intake manifold pressure transducer 12, engine temperature transducer 13, rpm transducer 14 and the lambda probe 15 in the exhaust-gas pipe 16 as well as an electronic control apparatus 17.

The electronic control apparatus processes the shown signals of intake air mass ML, throttle flap opening angle a, intake manifold pressure p, engine temperature tmot, engine rpm (n) and air/fuel mixture composition $\lambda$ to control signals for the internal combustion engine, for example, to determine the fuel injection pulsewidth ti, ignition signals, et cetera. In FIG. 1, the control apparatus 17 also outputs signals EVS and AVS which determine the opening function of the gas exchange valves 4 and 6. The valve actuation can be hydraulic, mechanical and adjustable individually and in groups. The specific realization of this valve actuation is not decisive. What is essential is that the control apparatus can adjust various opening functions of the inlet valves.

Figure 2:
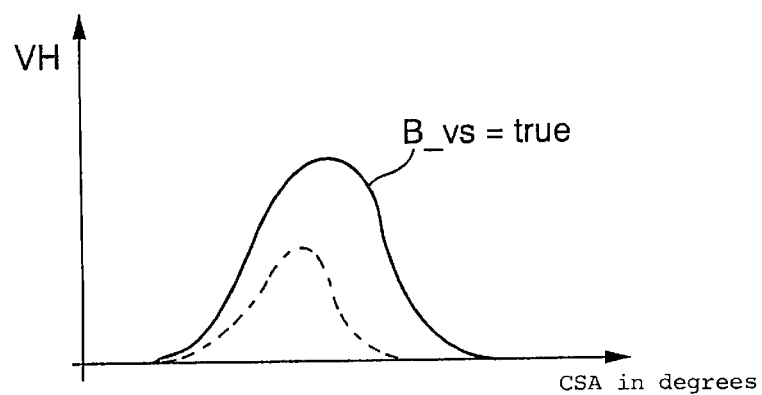
FIG. 2 shows two opening functions between which switching can take place.

Examples of different opening functions as valve stroke VH in dependence upon the angular position of the crankshaft (crankshaft angle in degrees) is shown in FIG. 2. The broken line function causes a more intense action of the throttle.

Figure 3:
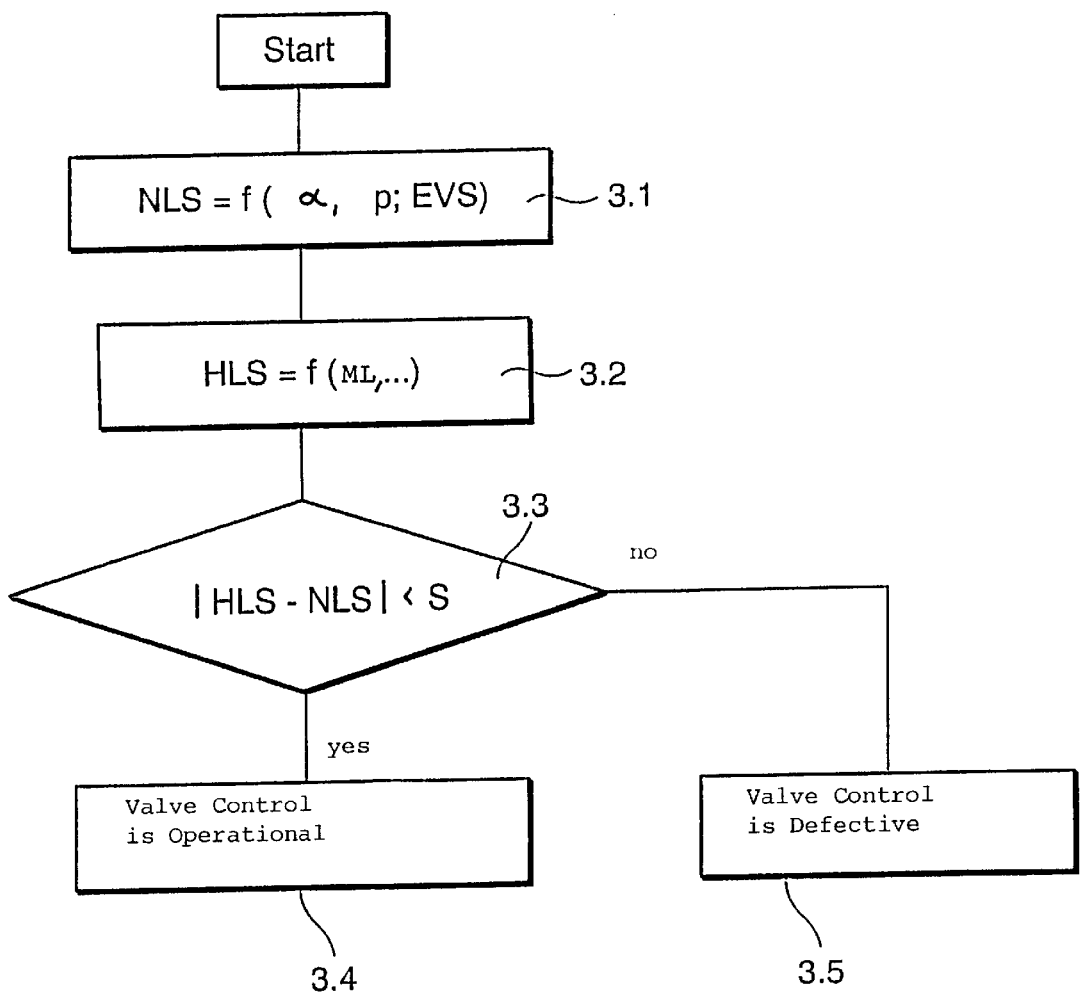
FIG. 3 is a flowchart showing a first embodiment of the method of the invention; and, FIG. 4 is a flowchart showing a second embodiment of the invention.

FIG. 3 is a flowchart showing a first embodiment of the method of the invention.

After a start of the diagnostic program, the ancillary load signal NLS is formed in step 3.1 from the throttle flap opening angle a and the inlet valve signal EVS. In step 3.2, the primary load signal HLS is formed from the inducted air mass ML. The sequence of the formation of the signals NLS and HLS is also reversible. Step 3.3 forms the magnitude of the difference of the primary and ancillary load signals and compares the absolute value thereof to a threshold value S. If, for example, the magnitude of the difference is less than the threshold value, then the valve control is deemed to be operational (step 3.4). If this magnitude is greater than the threshold value, then a fault announcement takes place in step 3.5.

In lieu of the difference, a quotient, which is formed from the signals HLS and NLS, can be compared to a pregiven reference value. If the quotient is approximately equal to 1, then the variable valve control is operational. A significant deviation from the value 1 signals a malfunction in the adjustment in the valve opening function. The extent of the deviation, which makes it possible to distinguish between operational and defective valve control, can be determined by test stand experiments and can be stored in the electronic control apparatus 17 for later use in the operation of the engine.

For given other parameters such as temperature and rpm, the cylinder charge is determined via the throttle flap opening angle and the valve opening function. For an operational valve control, the actual opening function corresponds to the desired opening function which is present in the electronic control apparatus 17 as a parameter. In this case, the ancillary load signal, which is formed from the throttle flap opening angle a and the control signal EVS, correctly reflects the actual cylinder charge. In the formation of the ancillary load signal, the intake manifold pressure (p) can be considered alternatively to or in addition to the throttle flap angle $\alpha$. The engine rpm (n) can be considered in the determination of the ancillary load signal NLS not as alternative but as supplementary. The actual cylinder charge is also reflected in the primary load signal HLS and independently of which control signal EVS is used in the electronic control apparatus. Stated otherwise, for an operational valve control, the primary load signal and the ancillary load signal do not differ in the ideal case which leads to the result of step 3.4 via the step 3.3.

Figure 4:
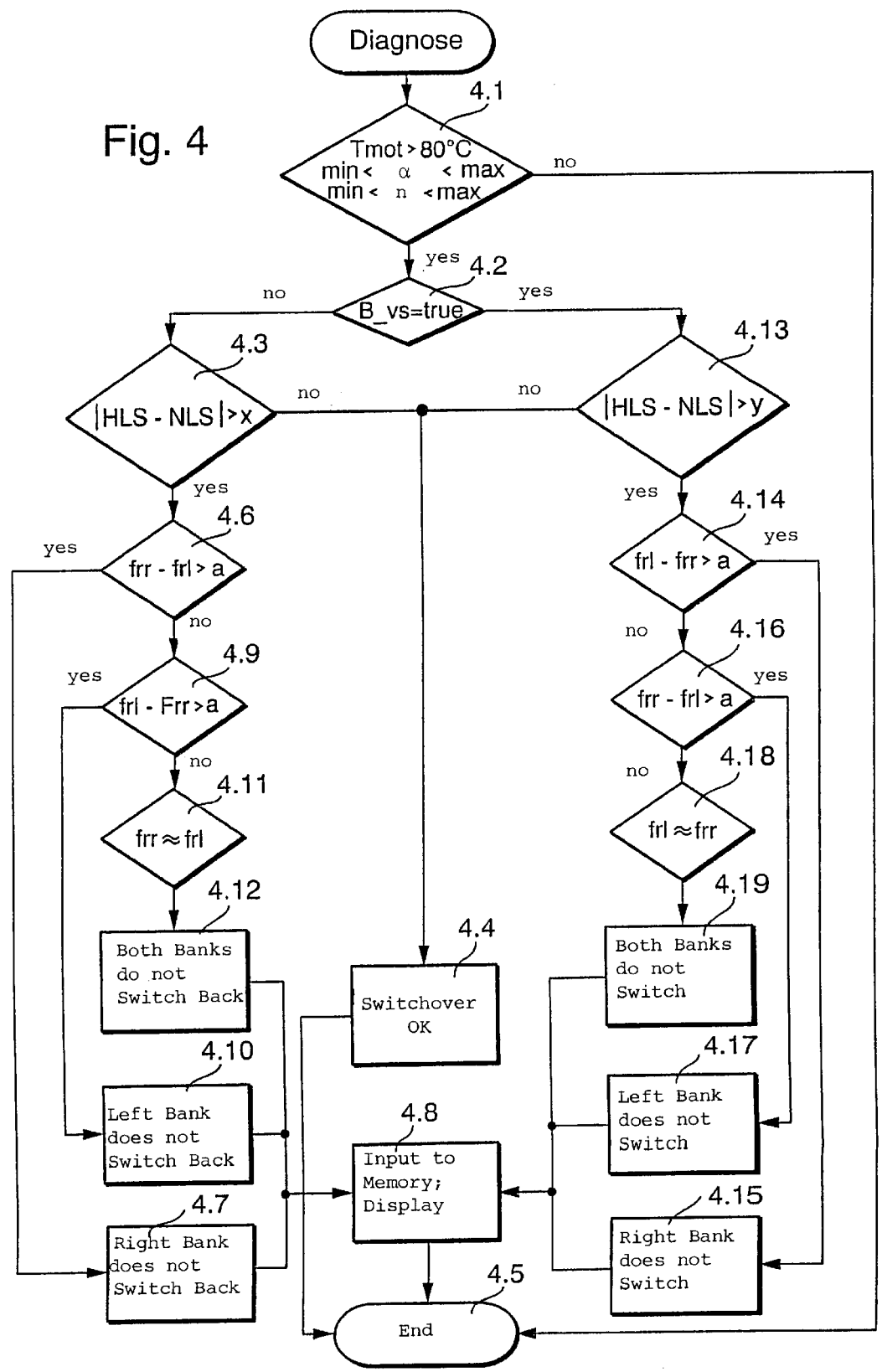

FIG. 4 shows another embodiment of the method of the invention which is based on an engine having at least two different cylinder groups and for which each cylinder group has a lambda control loop associated therewith and wherein a load detection, which is common for both cylinder groups, is used. Examples of different cylinder groups of engines are the two cylinder banks of a V-engine.

The operation of a lambda control is known and is here only briefly outlined.

The air/fuel mixture in the combustion chamber 2 is determined by the enclosed inducted air quantity and the fuel quantity metered via the injection valve 3. The lambda probe 15 supplies a measure for the mixture ratio of air and fuel to the electronic control apparatus 17. The fuel quantity to be metered can be changed by multiplicative correction of a base pulsewidth by a factor fr. An fr greater than 1 operates in the sense of enriching and an fr less than 1 operates in the sense of making the mixture more lean.

The embodiment of FIG. 4 compares, for a two-bank system, the control factors of the left and right banks to clarify whether both banks are defective or whether only one bank is defective and, if so, which bank is defective.

The diagnosis is activated only in specific operating regions of the engine. Accordingly, in step 4.1, an inquiry is made as to whether the engine temperature tmot is sufficiently high and whether the engine rpm (n) and the throttle flap opening angle a lie within permitted ranges. If this inquiry is answered in the affirmative, the step 4.2 determines the state of the valve control. Here, the condition B_vs=true corresponds, for example, to the solid line opening function in FIG. 2. Stated otherwise, the left branch of FIG. 4 concerns the condition in which, for example, the broken-line opening function should be adjusted which corresponds to a reduced inlet valve stroke. This desired preadjustment is considered in the formation of the ancillary load signal NLS. When the inlet valves of at least one of the banks do not follow this desired opening function and, in lieu thereof, execute a larger stroke, the cylinder charge increases and therefore the primary load signal HLS increases. A deviation of the primary and ancillary load signals is determined, if required, in step 4.3. If no deviation is present, then the switchover between both opening functions is deemed to be operational and the diagnosis is ended via the steps 4.4 and 4.5.

If step 4.3 confirms a minimum difference (x) between primary and ancillary load signals, then an evaluation of the lambda control factors frr and frl of the right and left cylinder banks takes place. If step 4.6 determines that frr is significantly (spacing a) greater than frl, then in step 4.7, the determination follows that the inlet valves of the right bank do not switch back to the reduced opening function. This information is stored in step 4.8 or is displayed. The physical background of this sequence is that the air charge of the right cylinders compared to the air charge of the left cylinders becomes greater when only the right inlet valves incorrectly execute the larger opening function.

Because of the load detection, which is common for both banks, the same base pulsewidth for driving the injection valves is formed for both banks. For the right bank, this leads in combination with increased air charge to a comparatively lean mixture and, in the left bank, to a comparatively rich mixture.

The lambda control loops, which are individual to the cylinder banks, operate in a compensating manner; that is, the lambda control factor frr of the right bank becomes greater and the factor frl of the left bank becomes smaller.

The mutually opposite conditions adjust when the valves of the left bank defectively do not switch back to the smaller opening function. Then, an air excess is present in the left bank. The control factor frl of the left bank increases. This fault is detected by the step sequence 4.9 and 4.10. If the inlet valves of both cylinder banks defectively do not switch back to the smaller opening function, then no differences result in the performance of the lambda controllers corresponding thereto. In both cases, the step sequence 4.3, 4.6, 4.9 and 4.11 leads to the identification of this fault in block 4.12.

Comparable conditions result in the right branch of FIG. 4. This is run through when the inquiry in step 4.2 is answered in the affirmative and therefore the large opening function should be adjusted.

In lieu of the above, when the inlet valves of at least one bank defectively execute the smaller opening function, then the ancillary load signal is defective so that the inquiry in step 4.13 is answered in the affirmative. If the right bank does not switch to the larger opening function, then its cylinders receive comparatively too little air. This leads to a drop of frr in order to adapt the fuel quantity. In this way, frl becomes greater than frr. This fault is identified by the step sequence 4.14 and 4.15. Correspondingly, the step sequence 4.16, 4.17 detects a defective small opening function for the left bank and the step sequence 4.18, 4.19 detects the defect of too small an opening function in both banks.

It is understood that the foregoing description is that of the preferred embodiments of the invention and that various changes and modifications may be made thereto without departing from the spirit and scope of the invention as defined in the appended claims.

What is claimed is:

1. A method for checking the operability of a variable valve control in an internal combustion engine having an intake manifold and wherein the state of the variable valve control contributes to determining the combustion chamber charge, the method comprising the steps of:

providing a first signal indicative of the air mass actually drawn in by said engine via said intake manifold;

forming a primary signal (HLS) for the combustion chamber charge from said first signal;

providing a second signal formed from a desired value for the state of said variable valve control and at least one of the following: the position of a throttle flap, the pressure in said intake manifold and the rpm of said engine;

forming an ancillary signal (NLS) for the combustion chamber charge from said second signal;

comparing said primary and ancillary signals (HLS, NLS) and forming an index for the deviation of said primary and ancillary signals (HLS, NLS) from each other; and, outputting and/or storing a fault signal when said index exceeds a predetermined value.

2. The method of claim 1, wherein said engine has at least two different cylinder groups having respective lambda control loops corresponding thereto and said engine having a load detecting arrangement common to both of said cylinder groups; and, wherein:

when the comparison of said primary and ancillary signals indicates a fault, comparing the corrective factors of said lambda control loops to obtain a comparison result; and, drawing a conclusion from said comparison result as to which of the cylinder groups has a fault.

3. The method of claim 1, wherein the check as to the operability of the variable valve control is activated only ip specific operating regions of said engine.

* * * * *

UNITED STATES PATENT AND TRADEMARK OFFICE
CERTIFICATE OF CORRECTION

PATENT NO. : 6,213,068 B1
DATED : April 10, 2001
INVENTOR(S) : Armin Hassdenteufel It is certified that error appears in the above-identified patent and that said Letters Patent is hereby corrected as shown below:

Column 6,
Line 29, delete "ip" and substitute -- in -- therefor.

Signed and Sealed this

Fourth Day of January, 2003

JAMES E. ROGAN
*Director of the United States Patent and Trademark Office*